United States Patent
Eck et al.

(10) Patent No.: US 10,174,827 B2
(45) Date of Patent: Jan. 8, 2019

(54) DRIVE CLUTCH IDLE BEARING TORQUE DRAG ASSEMBLY

(71) Applicant: TEAM Industries, Inc., Bagley, MN (US)

(72) Inventors: Brian G. Eck, Bemidji, MN (US); Brandon R Bonham, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 138 days.

(21) Appl. No.: 15/438,285

(22) Filed: Feb. 21, 2017

(65) Prior Publication Data

US 2018/0238430 A1    Aug. 23, 2018

(51) Int. Cl.

| F16H 59/00 | (2006.01) |
|---|---|
| F16H 61/00 | (2006.01) |
| F16H 63/00 | (2006.01) |
| F16H 55/56 | (2006.01) |
| F16H 37/08 | (2006.01) |
| F16H 37/02 | (2006.01) |
| F16C 19/46 | (2006.01) |

(Continued)

(52) U.S. Cl.
CPC ............ *F16H 55/56* (2013.01); *F16C 19/46* (2013.01); *F16C 21/005* (2013.01); *F16C 27/02* (2013.01); *F16H 9/14* (2013.01); *F16H 9/18* (2013.01); *F16H 37/022* (2013.01); *F16H 37/0813* (2013.01); *F16H 55/563* (2013.01); *F16C 2361/43* (2013.01)

(58) Field of Classification Search
CPC ............ F16H 55/563; F16H 61/66245; F16H 2061/66295; F16H 61/66227; F16D 43/10
USPC .......................................... 474/13, 14, 15, 16
See application file for complete search history.

(56) References Cited

U.S. PATENT DOCUMENTS

| 2,144,443 | A |   | 1/1939 | Thomas |
|---|---|---|---|---|
| 2,496,061 | A | * | 1/1950 | Miner ............... F16H 61/66245 474/14 |

(Continued)

FOREIGN PATENT DOCUMENTS

| CN | 101705981 | 5/2010 |
|---|---|---|
| CN | 104329421 | 2/2015 |

(Continued)

OTHER PUBLICATIONS

European Patent Office; "Extended European Search Report from EP Application No. 18157577.0 dated Jul. 13, 2018"; from Foreign Counterpart of U.S. Appl. No. 15/438,285; Dated: Jul. 13, 2018; pp. 1-9; Published: EP.

*Primary Examiner* — Henry Y Liu
(74) *Attorney, Agent, or Firm* — Fogg & Powers LLC (57) ABSTRACT

A clutch is provided that includes a fixed sheave portion, a movable sheave portion, a movable sheave assembly, an idler bearing and a torque drag member. The movable sheave assembly is configured to axially move the movable sheave portion in relation to the fixed sheave portion in response to a change in a rotational speed of the clutch. The idler bearing is rotationally mounted on a central post of the fixed sheave portion. The idler bearing is positioned to engage an inside face of a belt when the fixed sheave portion and the movable sheave portion are located a select distance away from each other. The torque drag member is operationally coupled to exert a select amount of torque drag on the idler bearing.

20 Claims, 8 Drawing Sheets

(51) Int. Cl.
*F16C 27/02* (2006.01)
*F16C 21/00* (2006.01)
*F16H 9/14* (2006.01)
*F16H 9/18* (2006.01)

(56) References Cited

U.S. PATENT DOCUMENTS

| | | | | | |
|---|---|---|---|---|---|
| 2,553,505 | A | * | 5/1951 | Miner | F16D 43/10 |
| | | | | | 192/105 A |
| 3,597,987 | A | * | 8/1971 | Kiekhaefer | F16H 61/66245 |
| | | | | | 474/14 |
| 3,605,511 | A | | 9/1971 | Deschene | |
| 3,648,532 | A | * | 3/1972 | Vallieres | F16H 61/66245 |
| | | | | | 474/14 |
| 3,715,930 | A | * | 2/1973 | Beliveau | F16H 61/6624 |
| | | | | | 474/16 |
| 3,733,918 | A | * | 5/1973 | Domaas | F16H 55/563 |
| | | | | | 192/105 C |
| 3,768,323 | A | * | 10/1973 | Houle | F16H 61/66245 |
| | | | | | 474/14 |
| 3,939,720 | A | * | 2/1976 | Aaen | F16H 55/563 |
| | | | | | 474/14 |
| 3,962,928 | A | * | 6/1976 | Beaudoin | F16H 55/563 |
| | | | | | 474/14 |
| 4,464,144 | A | * | 8/1984 | Kobayashi | F16H 55/563 |
| | | | | | 474/11 |
| 4,624,651 | A | * | 11/1986 | Jaccod | F16H 55/563 |
| | | | | | 474/13 |
| 4,826,467 | A | * | 5/1989 | Reese | F16H 55/563 |
| | | | | | 474/14 |
| 5,421,784 | A | * | 6/1995 | Robert | F16H 55/563 |
| | | | | | 474/13 |

FOREIGN PATENT DOCUMENTS

| | | |
|---|---|---|
| DE | 102012209459 | 12/2013 |
| FR | 2657406 A1 | 7/1991 |
| GB | 698498 | 10/1953 |
| WO | 03071162 A1 | 8/2003 |

\* cited by examiner

DRIVE CLUTCH IDLE BEARING TORQUE DRAG ASSEMBLY

BACKGROUND

A continuously variable transmission (CVT) includes a drive clutch and a driven clutch. The drive clutch is typically tied to the rotation of a crankshaft of an engine. Rotation of the drive clutch is transferred to the driven clutch via belt. The drive clutch typically includes a fixed sheave portion and a movable sheave portion. Both of the sheave portions include an engagement face surface that engages a respective side of the belt. As rotation of the drive clutch changes, the engagement face surfaces of the fixed sheave portion and the movable sheave portions move towards or away from each other changing the location that the belt engages the engagement faces surface. Movement of the belt up and down changes the gear ratio of the CVT. Typically, as rotation of the drive clutch slows down, the movable sheave portion moves away from the fixed sheave portion causing the belt to move down to an idler bearing assembly that is free to rotate about a central post. This allows an engine of a vehicle to idle in neutral without transferring significant torque to the driven clutch which would cause the vehicle to move. However, in this arrangement noise and shock loading at interfaces can occur when shifting from gear to gear (neutral to forward or reverse) in a downstream transmission of driveline components (gears, shift dogs, CV joints, etc.) as the result of backlash.

For the reasons stated above and for other reasons stated below which will become apparent to those skilled in the art upon reading and understanding the present specification, there is a need in the art for and effective and efficient system to remove backlash in the downstream driveline utilizing a CVT system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a clutch is provided that includes a fixed sheave portion, a movable sheave portion, a movable sheave assembly, an idle bearing and a torque drag member. The fixed sheave portion has a conically shaped fixed engagement face surface and a central post that extends from a central portion of the fixed engagement face surface about a rotational axis. The movable sheave portion has a conically shaped movable engagement face surface and a central passage. The central post of the fixed sheave portion is received in the central passage of the movable sheave to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion in response to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idle bearing is further positioned to engage an inside face of a belt when the fixed engagement face surface of the fixed sheave portion and the movable engagement face surface of the movable sheave portion are located a select distance away from each other. The torque drag member is operationally coupled to exert a select amount of torque drag on the idler bearing.

In another embodiment, another clutch is provided. The clutch includes a fixed sheave portion, a movable sheave portion, a movable sheave assembly, an idler bearing, a thrust washer, an idler cap and a biasing member. The fixed sheave portion has a conically shaped fixed engagement face surface and a central post that extends from a central portion of the fixed engagement face surface about a rotational axis. The movable sheave portion has a conically shaped movable engagement face surface and a central passage. The central post of the fixed sheave portion is received in the central passage of the movable sheave to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion in response to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idler bearing is further positioned to engage an inside face of a belt when the fixed engagement face surface of the fixed sheave portion and the movable engagement face surface of the movable sheave portion are located a select distance away from each other. The thrust washer is slidably mounted on the central post abutting an end of the idler bearing. The idler cap has a central passage and an inner chamber. The idler cap is mounted on the central post. The biasing member is at least partially received in the central chamber of the idler cap. The biasing member has a first end engaging an inner shoulder of the idler cap and a second end engaging the trust washer. The biasing member exerts a force on the thrust washer to create a select amount of torque drag on the idler bearing.

In still another embodiment, a vehicle is provided. The vehicle includes an engine, a transmission, at least one drive train and at least of a wheel and a track. The engine provides rotational torque. The transmission includes a continuously variable transmission portion with drive clutch. The clutch includes a fixed sheave portion, a movable sheave portion, a movable sheave assembly an idler bearing and a biasing member. The fixed sheave portion has a conically shaped fixed engagement face surface and a central post extending from a central portion of the fixed engagement face surface about a rotational axis. The movable sheave portion has a conically shaped movable engagement face surface and a central passage. The central post of the fixed sheave portion is received in the central passage of the movable sheave to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion due to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idle bearing further positioned to engage an inside face of a belt when the fixed engagement face surface of the fixed sheave portion and the movable engagement face surface of the movable sheave portion are located a select distance away from each other. The biasing member is operationally coupled to exert a select amount of torque drag on the idler bearing. The at least one drive train is operationally coupled to the transmission. Moreover, the at least one of the wheel and the track is operationally coupled to the at least one drive train.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
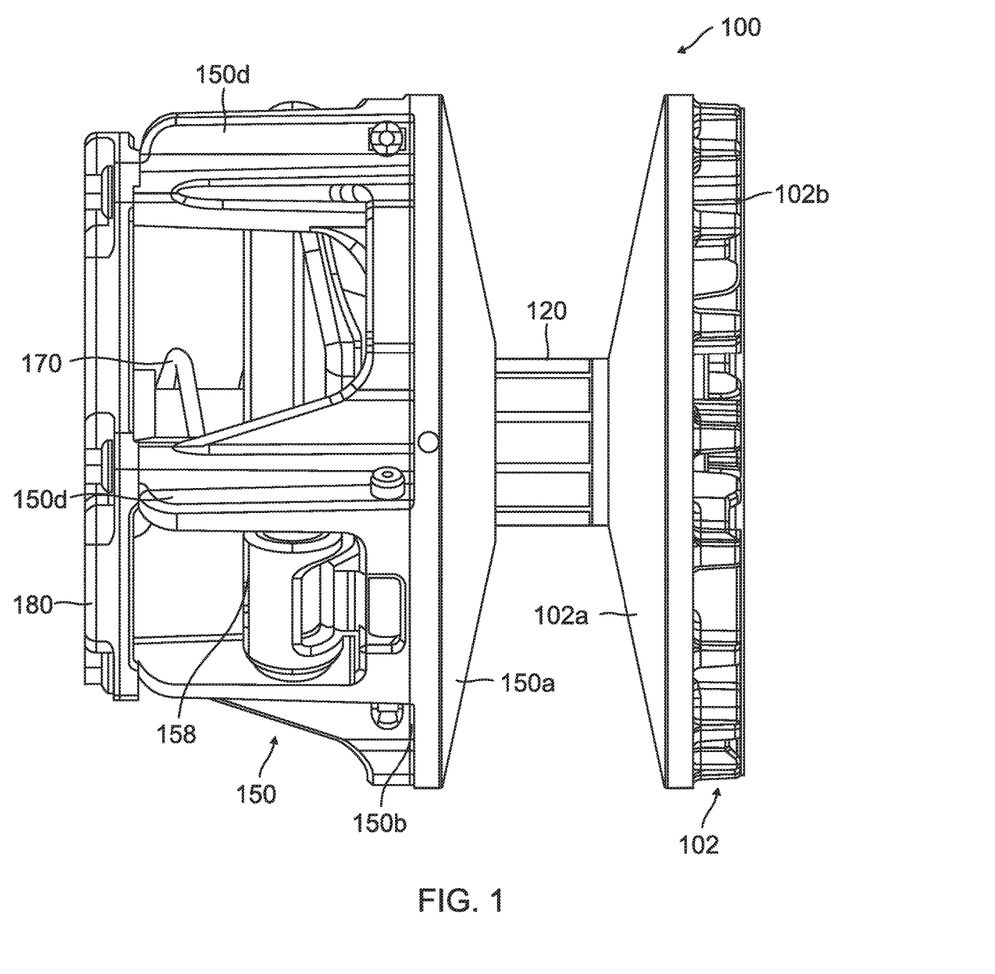
FIG. 1 is a side view of an assembled drive clutch of one embodiment of the present invention.

Embodiments of the present invention provide a clutch, such as a drive clutch 100, of a continuously variable transmission (CVT) having an idle bearing assembly with consistent drag torque. An embodiment of an assembled drive clutch 100 is illustrated in FIG. 1. An unassembled illustration of the drive clutch 100 is provided in FIGS. 4, 5 and 6. The drive clutch 100 includes a fixed sheave portion 102 and a movable sheave portion 150. The fixed sheave portion 102 includes a fixed engagement face surface 102a that is generally cone shaped in a radial direction and a second side 102b that is opposably positioned from the fixed engagement face surface 102a. The movable sheave assembly 150 includes a movable engagement face surface 150a that is generally cone shaped in a radial direction. The movable sheave assembly 150 further includes a second side 150b that is opposably positioned from the movable engagement face surface 150a. Extending from the second side 150b of the movable sheave portion 150 are peripherally positioned spacing posts 150d. A cover assembly 180 is coupled to terminal ends of the spacing posts 150d.

Figure 4:
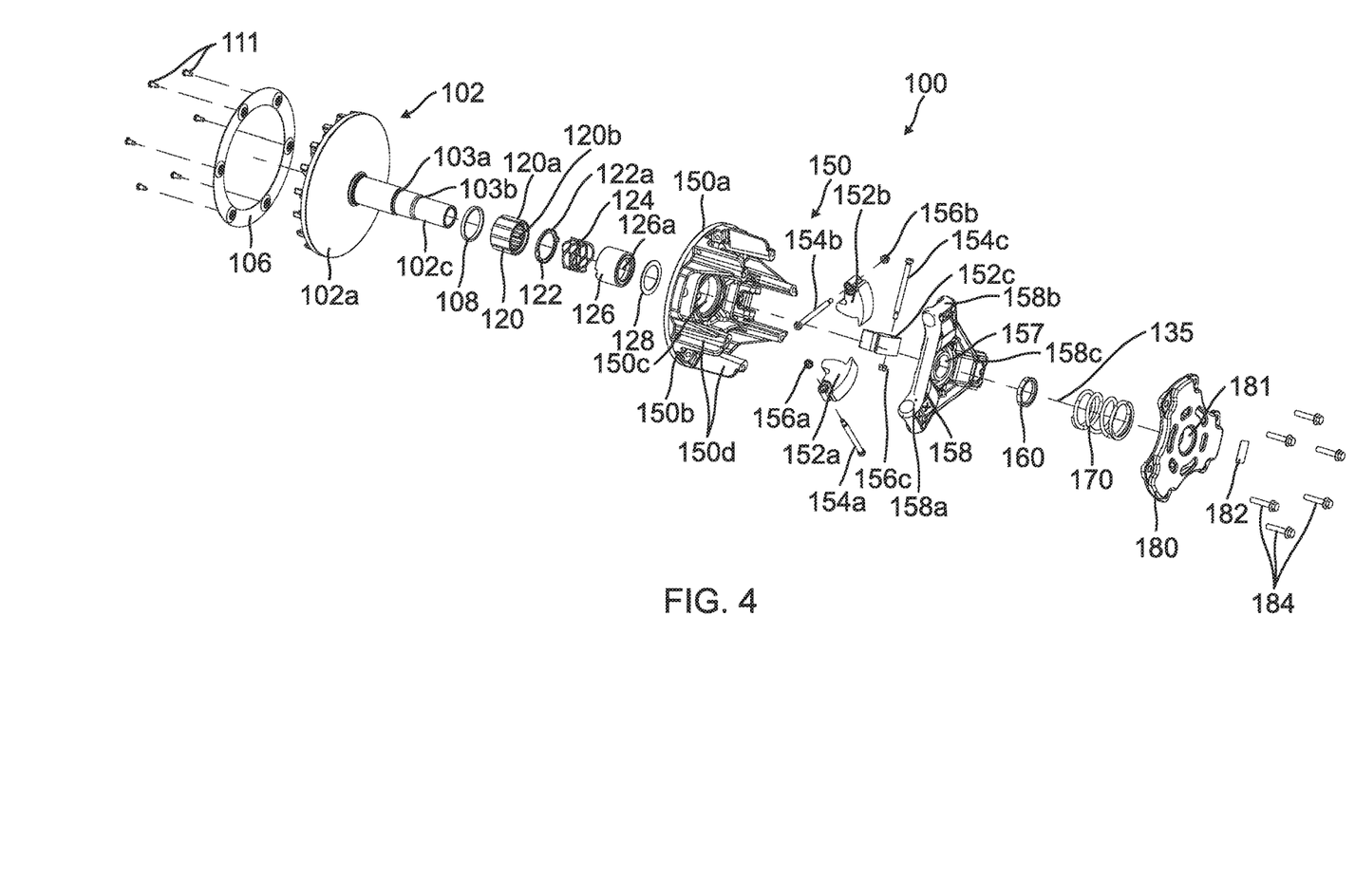
FIG. 4 is a side perspective unassembled view of the drive clutch of FIG. 1.

As best seen in FIG. 4, attached to the second side 150b of the fixed sheave portion 102 is a windage plate 106 via fasteners 111. The fixed sheave portion 102 includes a central post 102c with spaced shoulders 103a and 103b. Received on the central post 102c is a thrust spacer 108 which may or may not be rotationally fixed to central post 102c, an idler bearing 120, a keyed thrust spacer 122 with a key 122a, a wave compression spring 124, an idler cap 126 and spacer 128. The central post 102c is further received in a central passage 150c of the moveable sheave portion 150. The movable sheave portion 150 includes a movable sheave assembly, generally designated as 109 that includes components used to move the movable sheave portion 150 in relation to the fixed sheave portion 102 that includes a spider 158 and flyweight 152a, 152b and 152c assembly. A central passage 157 of the spider 158 receives and is mounted on the central post 102c. A central passage 181 of the cover assembly 180 further slidably receives the central post 102c. Further received on the central post 102c is the jam nut 160 and a compression spring 170. The jam nut 160 in an embodiment is threaded onto the central shaft 102c. The jam nut 160 prevents the spider 158 thread interface with the central shaft 102c from tightening or loosening and serves as a shift stop/travel limiter for the cover 180 and the moveable sheave 150. Fasteners 184 couple the cover assembly 180 to the terminal ends of the spacing posts 150d of the movable sheave assembly 150. Also illustrated in FIG. 4 are the flyweights 152a, 152b and 152c which are pivotally coupled to the movable sheave portion 150 proximate the second side 150b of the movable sheave portion 150 in a spaced fashion via respective flyweight bolts 154a, 154b, 154c and lock nuts 156a, 156b, 156c. Further label 182 is attached to the cover assembly 180.

Figure 2:
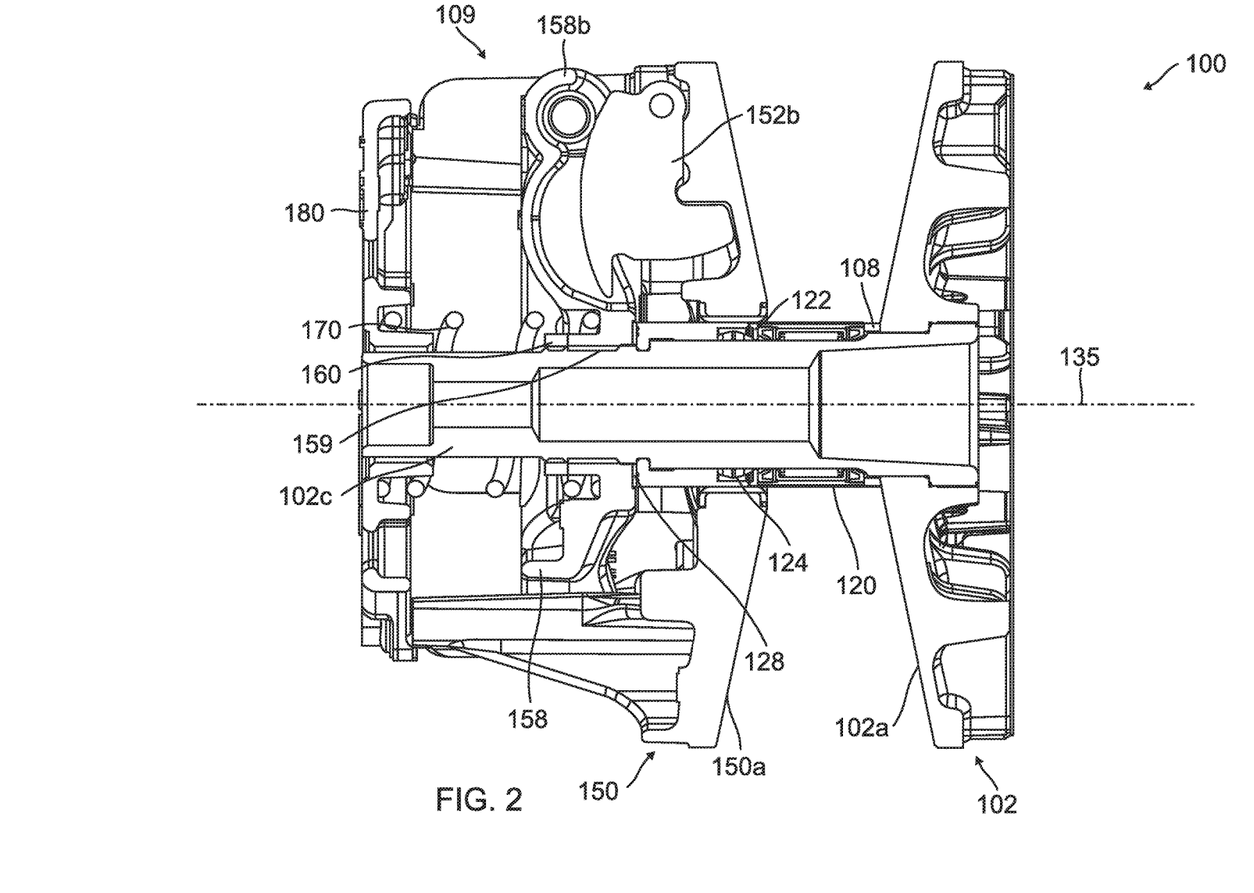
FIG. 2 is a cross-sectional side view of the assembled drive clutch of FIG. 1.
Figure 3:
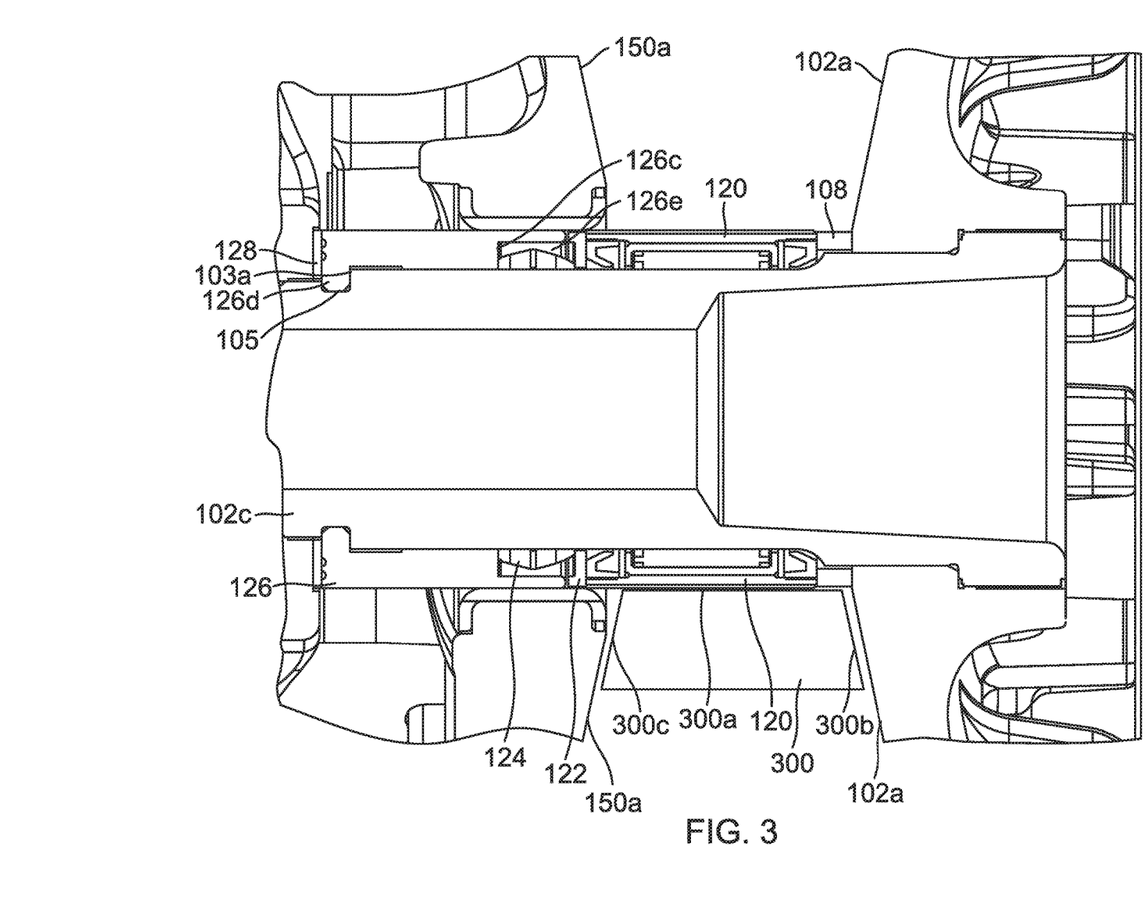
FIG. 3 is a partial close up cross sectional side view of the drive clutch of FIG. 1 illustrating the idle bearing assembly of an embodiment of the present invention and a portion of a belt engaging an idle bearing of the idle bearing assembly.

Referring to FIG. 2 a cross-sectional side view of the drive clutch 100 is illustrated. This view illustrates how the components are mounted on the center post 102c. As illustrated, the thrust spacer 108 is positioned to abut the fixed engagement face surface 102a of the stationary sheave portion 102. As discussed above, the thrust spacer 108 may or may not be rotationally fixed to central post 102c. Adjacent the thrust spacer 108 is the idler bearing 120 with an idle bearing outer engagement surface 120a as best illustrated in FIG. 4. The keyed thrust washer 122 is positioned on the other side of the idler bearing 120 which is best seen in the close up partial view of FIG. 3. The wave compression spring 124 (idler torque drag member or biasing member) is positioned between the keyed thrust washer 122 and the idler cap 126. The idler cap 126 includes a central passage 126a as shown in FIG. 4, an inner chamber 126e as best shown in FIG. 3 and an engagement lip 126d as also shown in FIG. 3. The biasing member 124 is positioned at least in part within the inner chamber 126e of the idler cap 126. The engagement lip 126d is received within a holding groove 105 of the central post 102c of the stationary sleeve 102. One side of the engagement lip 126d engages the first shoulder 103a of the central post 102c of the stationary sheave 102. Adjacent the other side of the engagement lip of the idler cap 126 is positioned spacer 128. The spider 158 abuts the spacer 128 as best illustrated in FIG. 2. In an embodiment, the spider 158 includes threads 159 that mate with threads on the center post 102c to lock rotation of the spider 158 with the center post 102c of the stationary sheave assembly 102. The jam nut 160 is locked on the center post 102c to prevent axial and rotational movement of the spider 158, as well as limiting travel of the movable sheave portion 150 and cover 180 in relation to the stationary sheave portion 102. As further illustrated in FIG. 2, the compression spring 170 is positioned between the spider 158 and the cover assembly 180 that is coupled to the movable sheave assembly 150.

In operation, as the drive clutch 100 turns faster, the flyweight weights 152a, 152b and 152c pivot out from the second side 150b of the movable sheave portion 150 and engage the spider 158. The faster the drive clutch 100 turns the more force is exerted on arms 158a, 158b and 158c of the spider 158 by the flyweights 152a, 152b and 152c. As soon as select amount of force is provided that counters the biasing force of the compression spring 170, the movable engagement face surface 150a of the portion sheave assembly 150 moves towards the fixed engagement face surface 102a of the stationary sheave portion 102 which would in turn cause a belt 300 (note that only half of the belt 300 is shown in FIG. 3 for illustrative purposes) to move away from a rotational axis 135 of the drive clutch 100 therein variably changing a gear ratio of a CVT using the drive clutch 100. In particular, side faces 300b and 300c of the belt 300 engaging the respective fixed engagement face surface 102a of the stationary sheave portion 102 and the movable engagement face surface 150a of the movable sheave portion 150 cause the belt to move towards or away from the rotational axis 135 as the movable sheave portion 150 moves in relation to the fixed sheave portion 102. When the drive clutch slows down, the force from the flyweights 152a, 152b and 152c on the spider 158 is lessened and the biasing force of the compression spring 170 moves the movable engagement face surface 150a of the movable sheave portion 150 away from the fixed engagement face surface 102a of the stationary sheave portion 102. This causes the belt 300 to move towards the rotational axis 135 of the drive clutch 100. During idle, the movable engagement face surface 150a of the movable sheave portion 150 moves away from the fixed engagement face surface 102a of the stationary sheave portion 102 far enough so an inner face 300a of the belt 300 rides on the idler bearing 120. In embodiments, friction is introduced on the idler bearing 120 to maintain a select level of drag torque on the idler bearing 120 when in use. As discussed above, the select level of drag torque eliminates or at least reduces noise and shock resulting from backlash to downstream driveline components such as gears, shift dogs, CV joints, chains, splines, etc.

Figure 5:
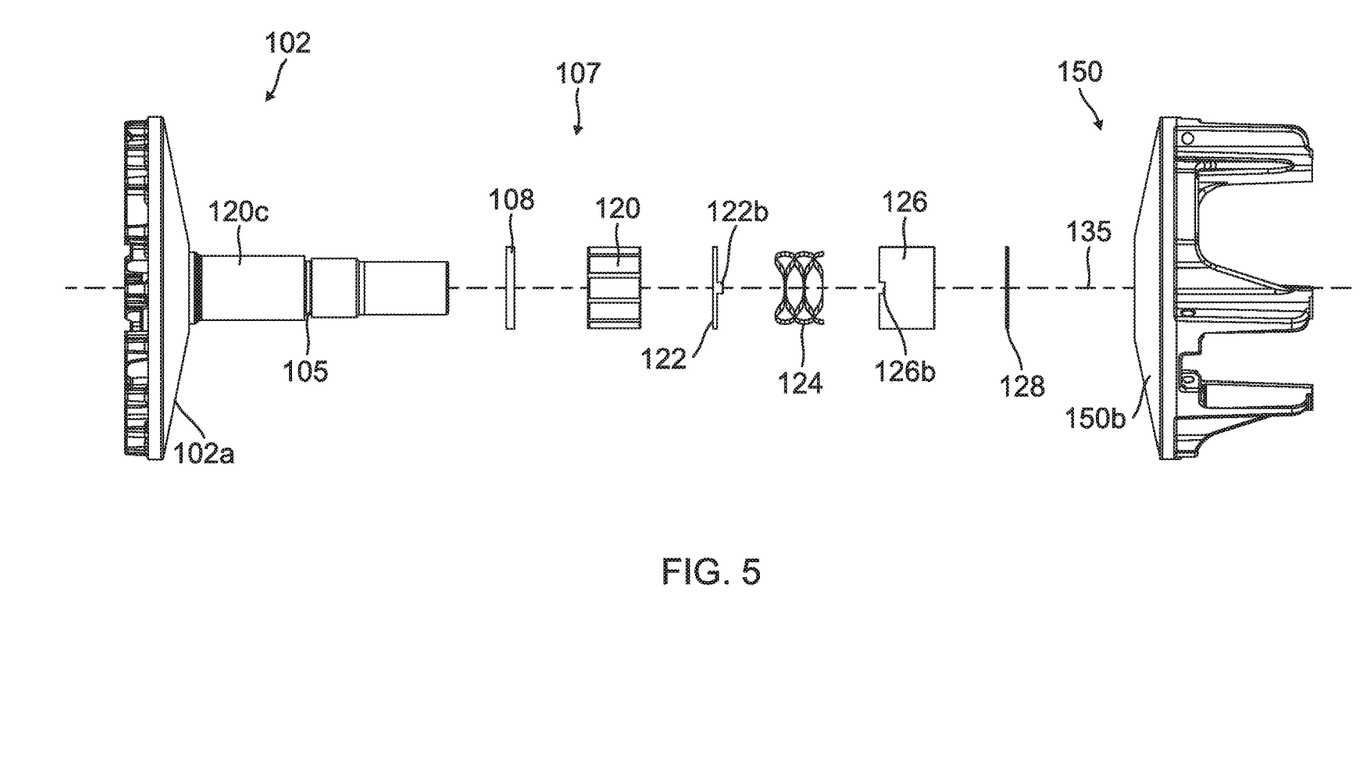
FIG. 5 is a partial side unassembled view of the drive clutch of FIG. 1 illustrating the idler drag torque assembly.
Figure 6:
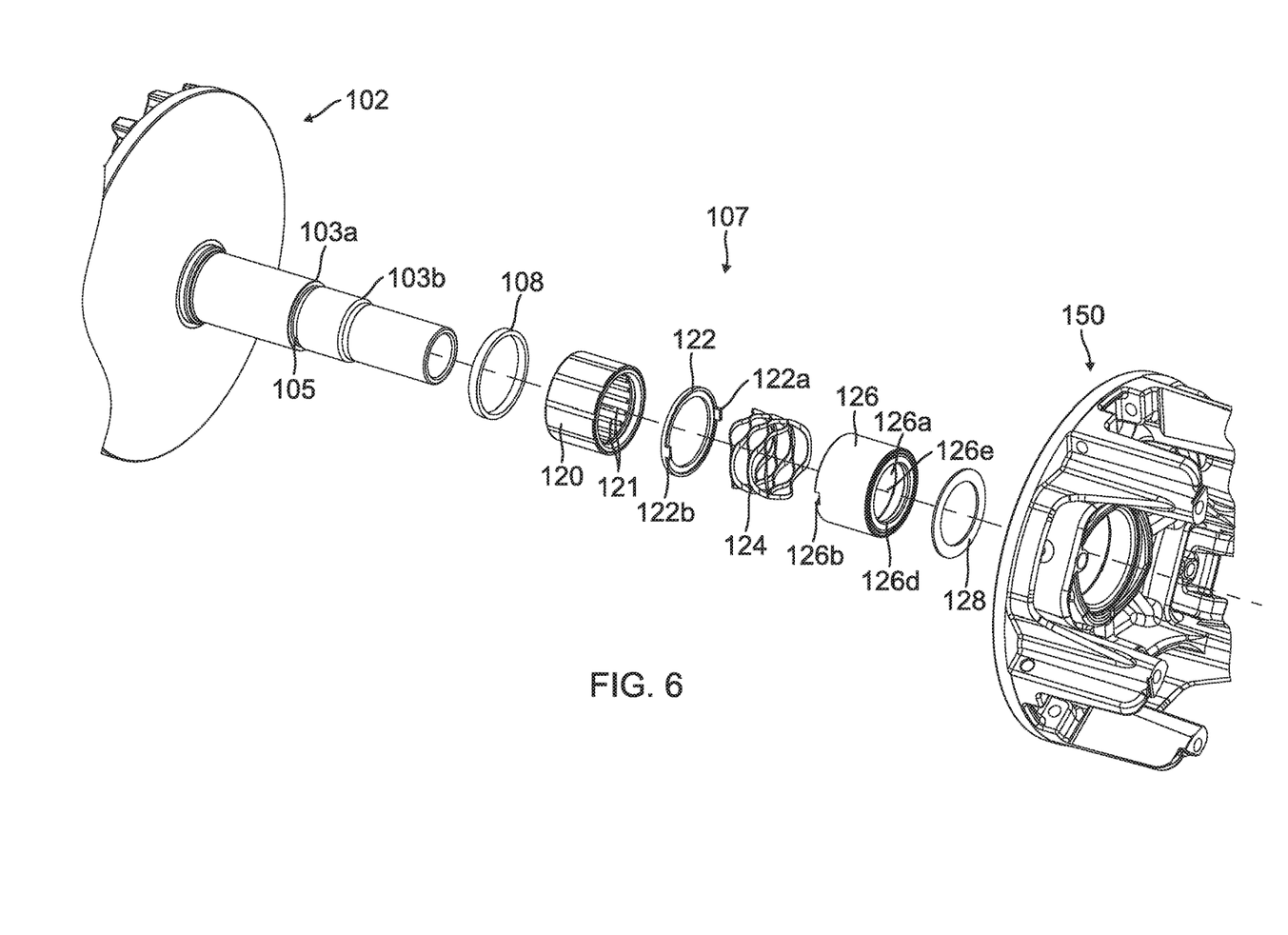
FIG. 6 is a partial side perspective unassembled view of the drive clutch of FIG. 1 also illustrating the idler drag torque assembly.

The elements that set out the idler drag torque assembly 107 are illustrated in FIGS. 5 and 6. As illustrated, the idler drag torque assembly 107 includes the thrust spacer 108 (which may or may not be rotationally fixed to the central post 102c), the idler bearing 120, the keyed thrust washer 122, the compression spring 124, the idler cap 126 and the spacer 128. As best illustrated in FIG. 6, the idler bearing 120 in this embodiment includes needle bearings 121. Other embodiments may implement a plain bushing. The keyed thrust washer 122 includes one or more keys, represented by keys 122a and 122b. The keys 122a and 122b are received in holding slots in an end of the idler cap 126. Only holding slot 126b to receive key 122b is illustrated in FIG. 6. However, another holding slot in the idler cap, not shown, would receive key 122a of the keyed thrust washer 122. The key-holding slot arrangement resists rotation of the keyed thrust washer 122 with the idler bearing 120.

Referring back to FIG. 3, a discussion of the operation of the idler drag torque assembly 107 is provided. As illustrated, the wave compression spring 124 (biasing member) has a first end that abuts an inner shoulder 126c of the idler cap 126. A second end of the wave compression spring 124 engages the keyed thrust washer 122. Since, the idler cap 126 is axially held in a static location in relation to the central post 102c of the stationary sheave assembly 102 via the engagement lip 126d of the idler cap received in the holding groove 105 of the central post 102c of the stationary sleeve 102, a force from the wave compression spring 124 is exerted on the keyed thrust washer 122 axially towards the idler bearing 120. In response, the keyed thrust washer 122 exerts a force on the idler bearing 120 to create the drag torque on the idler bearing 120. The amount of drag torque provided is determined by the amount of force provided by the wave compression spring 124. Hence, a desired amount of torque drag can be achieved by selecting a wave compression spring 124 that produces a select amount of force on the keyed trust washer 122. As discussed above, rotation of the keyed thrust washer 122 is rotationally fixed to the idler cap 126. Thrust spacer 108 may or may not be rotationally fixed to the central post 102c depending on the embodiment.

Figure 7:
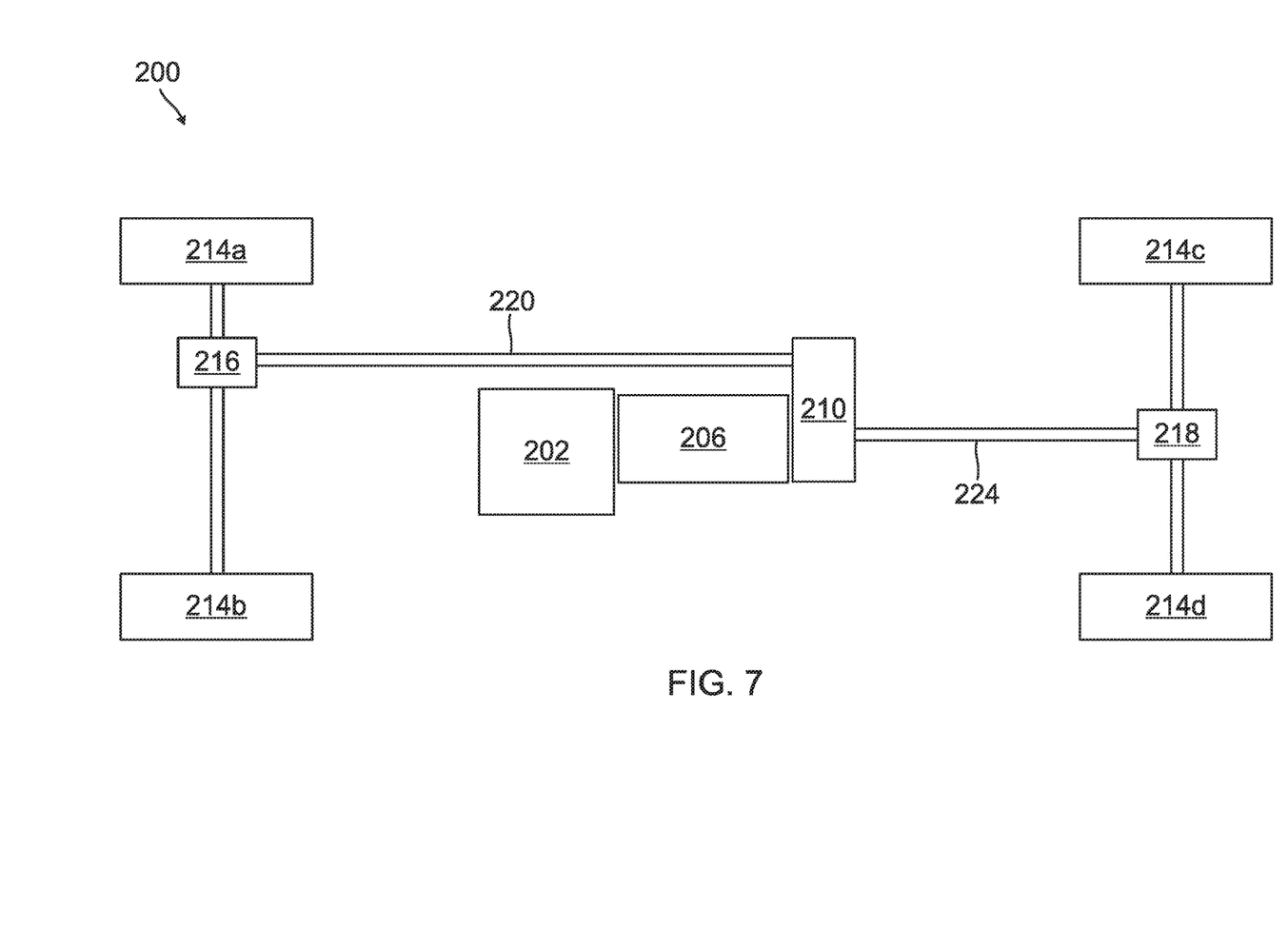
FIG. 7 is a block diagram of a vehicle of an embodiment of the present invention.

FIG. 7 illustrates a vehicle 200 implementing a clutch, such as drive clutch 100 described above in CVT portion 206 of at transmission. The vehicle 200 includes an engine 202 that provides rotational torque to the CVT portion 206 of the transmission. As mentioned, the CVT portion 206 includes the drive clutch 100 that is in rotational communication with a crankshaft of the engine 202. The CVT portion 206 also includes a driven clutch that is rotationally coupled to the drive clutch via a belt discussed above. A gear box portion of the transmission 210 receives the torque from the CVT portion of the transmission. In particular, in an embodiment, the gear box portion 210 is in rotational communication with the driven clutch. The gear box portion 210 provides and output to a front drive shaft 220 and a rear drive shaft 224 in this example embodiment. The front drive shaft 220 is rotationally coupled to a front differential 216 that provides torque to the front wheels 214a and 214b. The rear drive shaft 224 is rotationally coupled to a rear differential 218. The rear differential 218 provides torque to the rear wheels 214c and 214d.

Figure 8:
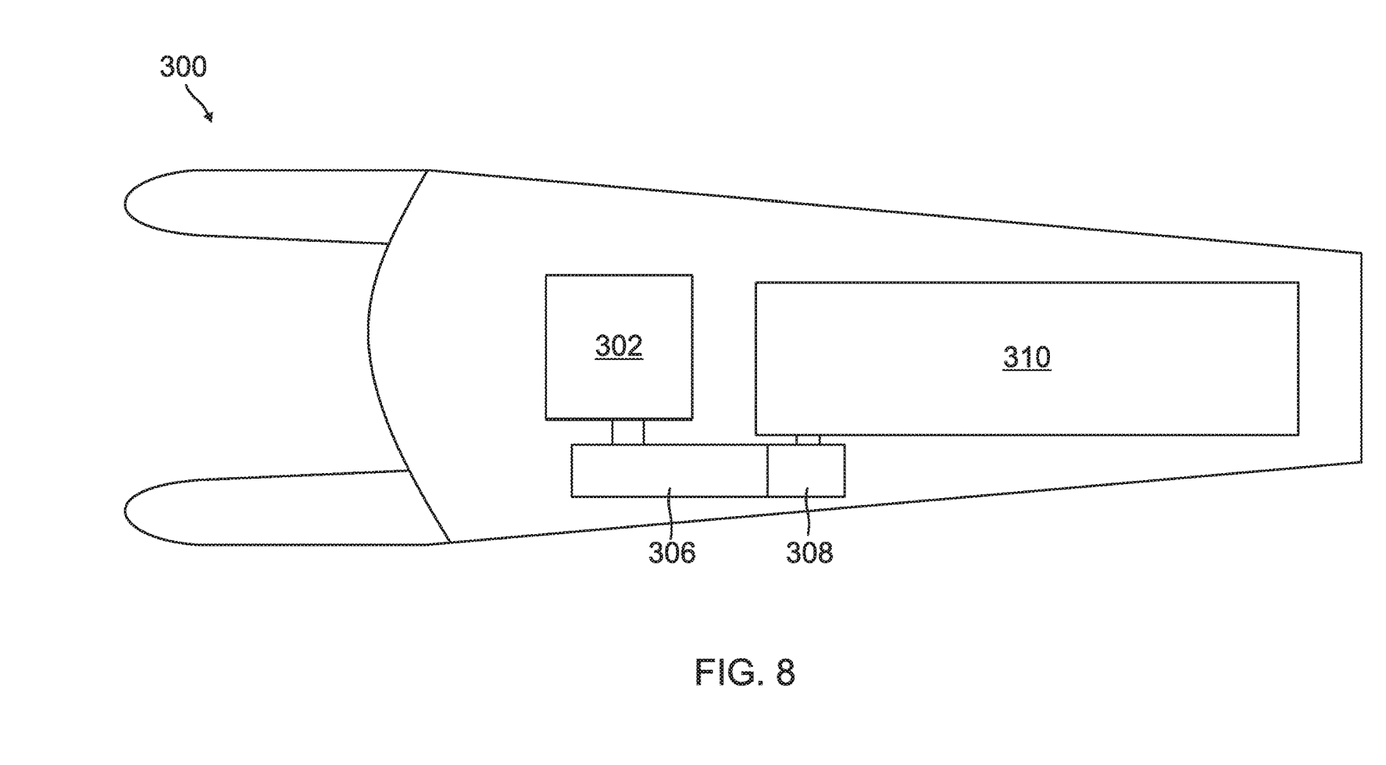
FIG. 8 is a block diagram of another vehicle of an embodiment of the present invention.

FIG. 8 illustrates a track vehicle 300 implementing a clutch, such as drive clutch 100 described above in CVT portion 306 of at transmission. The vehicle 300 includes an engine 302 that provides rotational torque to the CVT portion 306 of the transmission. As mentioned, the CVT portion 306 includes the drive clutch 100 that is in rotational communication with a crankshaft of the engine 302. The CVT portion 306 also includes a driven clutch that is rotationally coupled to the drive clutch via a belt discussed above. A drive train 308 is operationally coupled to receive the torque from the CVT portion of the transmission 306. The drive train 308 in turn provides torque to the track assembly 310 to move the track vehicle 300.

EXAMPLE EMBODIMENTS

Example 1 includes a clutch with a fixed sheave portion, a movable sheave portion, a movable sheave assembly, an idle bearing and a torque drag member. The fixed sheave portion has a conically shaped fixed engagement face surface and a central post that extends from a central portion of the fixed engagement face surface about a rotational axis. The movable sheave portion has a conically shaped movable engagement face surface and a central passage. The central post of the fixed sheave portion is received in the central passage of the movable sheave portion to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion in response to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idler bearing is further positioned to engage an inside face of a belt when the fixed engagement face surface of the fixed sheave portion and the movable engagement face surface of the movable sheave portion are located a select distance away from each other. The torque drag member is operationally coupled to exert a select amount of torque drag on the idler bearing.

Example 2 includes the clutch of example claim 1, wherein the idler drag toque assembly provides consistent drag torque on the idler bearing.

Example 3 includes the clutch of any of the Examples 1-2, wherein the idler drag torque assembly further includes a thrust washer that is slidably mounted on the central post abutting an end of the idler bearing. A torque drag member is positioned to exert a force on the thrust washer to create the select amount of torque drag on the idler bearing.

Example 4 includes the clutch of any of the Examples 1-3, wherein the idler drag torque assembly further includes an idler cap that is mounted on the central post. The torque drag member has a first end engaging an inner shoulder of the idler cap. The torque drag member further has a second end engaging the thrust washer.

Example 5 includes the clutch of any of the Examples 1-4, wherein the idler cap of the idler drag torque assembly includes at least one holding slot and the thrust washer includes at least one key. The at least one key is received in the at least one holding slot of the idler cap.

Example 6 includes the clutch of any of the Examples 1-5, wherein the idler drag torque assembly includes a biasing member mounted on the center post.

Example 7 includes the clutch of any of the Examples 1-6, wherein the biasing member is at least one of a wave compression spring and a compression spring.

Example 8 includes the clutch of any of the Examples 1-7, further including a thrust spacer that is positioned between the fixed engagement face surface of the fixed sheave portion and the idler bearing.

Example 9 includes the clutch of any of the Examples 1-8, wherein the movable sheave assembly further includes a spider statically that is mounted on the central post of the fixed sheave portion. A cover assembly that is coupled to the movable sheave portion. A compression spring that is positioned between the spider and the cover assembly. The compression spring applies a biasing force on the cover assembly therein causing the movable engagement face surface of the movable sheave portion to be positioned away from the fixed engagement face surface of the fixed sheave portion to allow an inner surface of a belt to engage the idler bearing. In addition, a plurality of flyweights are pivotally coupled to the movable sheave portion. The plurality of flyweights are configured to pivotally engage the spider with a force that increases as the rotational speed of the clutch increases therein countering the biasing force of the compression spring and moving the fixed engagement face surface of the fixed sheave portion and the movable engagement face surface of the movable sheave portion towards each other.

Example 10 includes a clutch with a fixed sheave portion, a movable sheave portion, a movable sheave assembly, an idler bearing, a thrust washer, an idler cap and a biasing member. The fixed sheave portion has a conically shaped fixed engagement face surface and a central post that extends from a central portion of the fixed engagement face surface about a rotational axis. The movable sheave portion has a conically shaped movable engagement face surface and a central passage. The central post of the fixed sheave portion is received in the central passage of the movable sheave portion to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion in response to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idler bearing is further positioned to engage an inside face of a belt when the fixed engagement face surface of the fixed sheave portion and the movable engagement face surface of the movable sheave portion are located a select distance away from each other. The thrust washer is slidably mounted on the central post abutting an end of the idler bearing. The idler cap has a central passage and an inner chamber. The idler cap is mounted on the central post. The idler cap further has an engagement lip that is received in a holding groove of central post to prevent axial movement of the idler cap in relation to the central post. The biasing member is at least partially received in the central chamber of the idler cap. The biasing member has a first end engaging an inner shoulder of the idler cap and a second end engaging the trust washer. The biasing member exerts a force on the thrust washer to create a select amount of torque drag on the idler bearing.

Example 11 includes the clutch of Example 10, further wherein the idler cap has at least one holding slot and the thrust washer has at least one key that is received in the at least one holding slot of the idler cap.

Example 12 includes the clutch of any of the Examples 10-11, wherein the biasing member being mounted on the center post.

Example 13 includes the clutch of any of the Examples 10-12, wherein the biasing member is at least one of a wave compression spring and a compression spring.

Example 14 includes the clutch of any of the Examples 10-13, further including a thrust spacer that is positioned between the fixed engagement face surface of the fixed sheave portion and the idler bearing.

Example 15 includes a vehicle having, an engine, a transmission, at least one drive train and at least one of a wheel and a track. The engine provides rotational torque. The transmission includes a continuously variable transmission portion with a clutch. The clutch includes a fixed sheave portion, a movable sheave portion, a movable sheave assembly an idler bearing and a biasing member. The fixed sheave portion has a conically shaped fixed engagement face surface and a central post extending from a central portion of the fixed engagement face surface about a rotational axis. The movable sheave portion has a conically shaped movable engagement face surface and a central passage. The central post of the fixed sheave portion is received in the central passage of the movable sheave portion to slidably mount the movable sheave portion to the fixed sheave portion. The conically shaped fixed engagement face surface of the fixed sheave portion faces the conically shaped movable engagement face surface of the movable sheave portion. The movable sheave assembly is configured to axially move the movable sheave portion in relation to the fixed sheave portion due to a change in a rotational speed of the clutch. The idler bearing is rotationally mounted on the central post. The idler bearing is located at least in part between the fixed engagement face surface of the fixed sheave portion and the movable engagement face surface of the movable sheave portion. The idler bearing is further positioned to engage an inside face of a belt when the fixed engagement face surface of the fixed sheave portion and the movable engagement face surface of the movable sheave portion are located a select distance away from each other. The biasing member is operationally coupled to exert a select amount of torque drag on the idler bearing. The at least one drive train is operationally coupled to the transmission. Moreover, the at least one of the wheel and track is operationally coupled to the at least one drive train.

Example 16 includes the vehicle of Example 15, further including at least one differential that is operationally coupled between the at least one drive train and the at least one wheel and track.

Example 17 includes the vehicle of any of the Examples 15-16, wherein the clutch further includes a thrust washer slidably that is mounted on the central post of the fixed sheave portion. The thrust washer abuts an end of the idler bearing. The biasing member is positioned to exert a force on the thrust washer to create the select amount of torque drag on the idler bearing.

Example 18 includes the vehicle of any of the Examples 15-17, wherein the clutch further includes an idler cap that is mounted on the central post. The biasing member has a first end that engages an inner shoulder of the idler cap. The biasing member further has a second end that engages the thrust washer.

Example 19 includes the vehicle of any of the Examples 15-18, wherein the idler cap of the clutch further includes at least one holding slot and the thrust washer has at least one key that is received in the at least one holding slot of the idler cap.

Example 20 includes the vehicle of any of the Examples 15-19, wherein the biasing member of the clutch is at least one of a wave compression spring and a compression spring.

Although specific embodiments and examples have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:
1. A clutch comprising:
    a fixed sheave portion having a conically shaped fixed engagement face surface and a central post extending from a central portion of the fixed engagement face surface about a rotational axis;
    a movable sheave portion having a conically shaped movable engagement face surface and a central passage, the central post of the fixed sheave portion received in the central passage of the movable sheave portion to slidably mount the movable sheave portion to the fixed sheave portion, the conically shaped fixed engagement face surface of the fixed sheave portion facing the conically shaped movable engagement face surface of the movable sheave portion;
    a movable sheave assembly configured to axially move the movable sheave portion in relation to the fixed sheave portion in response to a change in a rotational speed of the clutch;
    an idler bearing rotationally mounted on the central post, the idler bearing located at least in part between the fixed engagement face surface of the fixed sheave portion and the movable engagement face surface of the movable sheave portion, the idler bearing further positioned to engage an inside face of a belt when the fixed engagement face surface of the fixed sheave portion and the movable engagement face surface of the movable sheave portion are located a select distance away from each other; and
    an idler drag torque assembly operationally coupled to exert a select amount of torque drag on the idler bearing.

2. The clutch of claim 1, wherein the idler drag torque assembly provides consistent drag torque on the idler bearing.

3. The clutch of claim 1, wherein the idler drag torque assembly further comprises:
    a thrust washer slidably mounted on the central post abutting an end of the idler bearing; and
    a torque drag member positioned to exert a force on the thrust washer to create the select amount of torque drag on the idler bearing.

4. The clutch of claim 3, wherein the idler drag torque assembly further comprises:
    an idler cap mounted on the central post; and
    the torque drag member having a first end engaging an inner shoulder of the idler cap, the torque drag member further having a second end engaging the thrust washer.

5. The clutch of claim 4, wherein the idler drag torque assembly further comprises:
    the idler cap having at least one holding slot; and
    the thrust washer having at least one key that is received in the at least one holding slot of the idler cap.

6. The clutch of claim 4, further comprising:
    the idler drag torque assembly including a biasing member mounted on the center post.

7. The clutch of claim 6, wherein the biasing member is at least one of a wave compression spring and a compression spring.

8. The clutch of claim 1, further comprising:
    a thrust spacer positioned between the fixed engagement face surface of the fixed sheave portion and the idler bearing.

9. The clutch of claim 1, wherein the movable sheave assembly further comprises:
    a spider statically mounted on the central post of the fixed sheave portion;
    a cover assembly coupled to the movable sheave portion;
    a compression spring positioned between the spider and the cover assembly, the compression spring applying a biasing force on the cover assembly causing the movable engagement face surface of the movable sheave portion to be positioned away from the fixed engagement face surface of the fixed sheave portion to allow an inner surface of a belt to engage the idler bearing; and a plurality of flyweights pivotally coupled to the movable sheave portion, the plurality of flyweights configured to pivotally engage the spider with a force that increases as the rotational speed of the clutch increases therein countering the biasing force of the compression spring and moving the fixed engagement face surface of the fixed sheave portion and the movable engagement face surface of the movable sheave portion towards each other.

10. A clutch comprising:

a fixed sheave portion having a conically shaped fixed engagement face surface and a central post extending from a central portion of the fixed engagement face surface about a rotational axis;

a movable sheave portion having a conically shaped movable engagement face surface and a central passage, the central post of the fixed sheave portion received in the central passage of the movable sheave portion to slidably mount the movable sheave portion to the fixed sheave portion, the conically shaped fixed engagement face surface of the fixed sheave portion facing the conically shaped movable engagement face surface of the movable sheave portion;

a movable sheave assembly configured to axially move the movable sheave portion in relation to the fixed sheave portion in response to a change in a rotational speed of the clutch;

an idler bearing rotationally mounted on the central post, the idler bearing located at least in part between the fixed engagement face surface of the fixed sheave portion and the movable engagement face surface of the movable sheave portion, the idler bearing further positioned to engage an inside face of a belt when the fixed engagement face surface of the fixed sheave portion and the movable engagement face surface of the movable sheave portion are located a select distance away from each other;

a thrust washer slidably mounted on the central post abutting an end of the idler bearing, an idler cap having a central passage and an inner chamber, the idler cap mounted on the central post; and a biasing member at least partially received in the central chamber of the idler cap, the biasing member having a first end engaging an inner shoulder of the idler cap and a second end engaging the thrust washer, the biasing member exerting a force on the thrust washer to create a select amount of torque drag on the idler bearing.

11. The clutch of claim 10, further comprising:

the idler cap having at least one holding slot; and the thrust washer having at least one key that is received in the at least one holding slot of the idler cap.

12. The clutch of claim 10, further comprising:

the biasing member being mounted on the center post.

13. The clutch of claim 10, wherein the biasing member is a wave compression spring.

14. The clutch of claim 10, further comprising:

a thrust spacer positioned between the fixed engagement face surface of the fixed sheave portion and the idler bearing.

15. A vehicle comprising:

an engine to provide rotational torque;

a transmission including a continuously variable transmission portion with a clutch, the clutch including, a fixed sheave portion having a conically shaped fixed engagement face surface and a central post extending from a central portion of the fixed engagement face surface about a rotational axis, a movable sheave portion having a conically shaped movable engagement face surface and a central passage, the central post of the fixed sheave portion received in the central passage of the movable sheave portion to slidably mount the movable sheave portion to the fixed sheave portion, the conically shaped fixed engagement face surface of the fixed sheave portion facing the conically shaped movable engagement face surface of the movable sheave portion, a movable sheave assembly configured to axially move the movable sheave portion in relation to the fixed sheave portion due to a change in a rotational speed of the clutch, an idler bearing rotationally mounted on the central post, the idler bearing located at least in part between the fixed engagement face surface of the fixed sheave portion and the movable engagement face surface of the movable sheave portion, the idler bearing further positioned to engage an inside face of a belt when the fixed engagement face surface of the fixed sheave portion and the movable engagement face surface of the movable sheave portion are located a select distance away from each other; and a biasing member operationally coupled to exert a select amount of torque drag on the idler bearing;

at least one drive train operationally coupled to the transmission; and at least one of a wheel and a track operationally coupled to the at least one drive train.

16. The vehicle of claim 15, further comprising:

at least one differential operationally coupled between the at least one drive train and the at least one of the wheel and the track.

17. The vehicle of claim 15, wherein the clutch further comprises:

a thrust washer slidably mounted on the central post of the fixed sheave portion, the thrust washer abutting an end of the idler bearing, the biasing member positioned to exert a force on the thrust washer to create the select amount of torque drag on the idler bearing.

18. The clutch of claim 17, wherein the clutch further comprises:

an idler cap mounted on the central post, the idler cap having an engagement lip that is received in a holding groove of central post to prevent axial movement of the idler cap in relation to the central post; and the biasing member having a first end engaging an inner shoulder of the idler cap, the biasing member further having a second end engaging the thrust washer.

19. The vehicle of claim 18, wherein the clutch further comprises:

the idler cap having at least one holding slot; and the thrust washer having at least one key that is received in the at least one holding slot of the idler cap.

20. The vehicle of claim 18, wherein the clutch further comprises:

the biasing member being a wave compression spring.

\* \* \* \* \*